No. 740,275. Patented September 29, 1903.

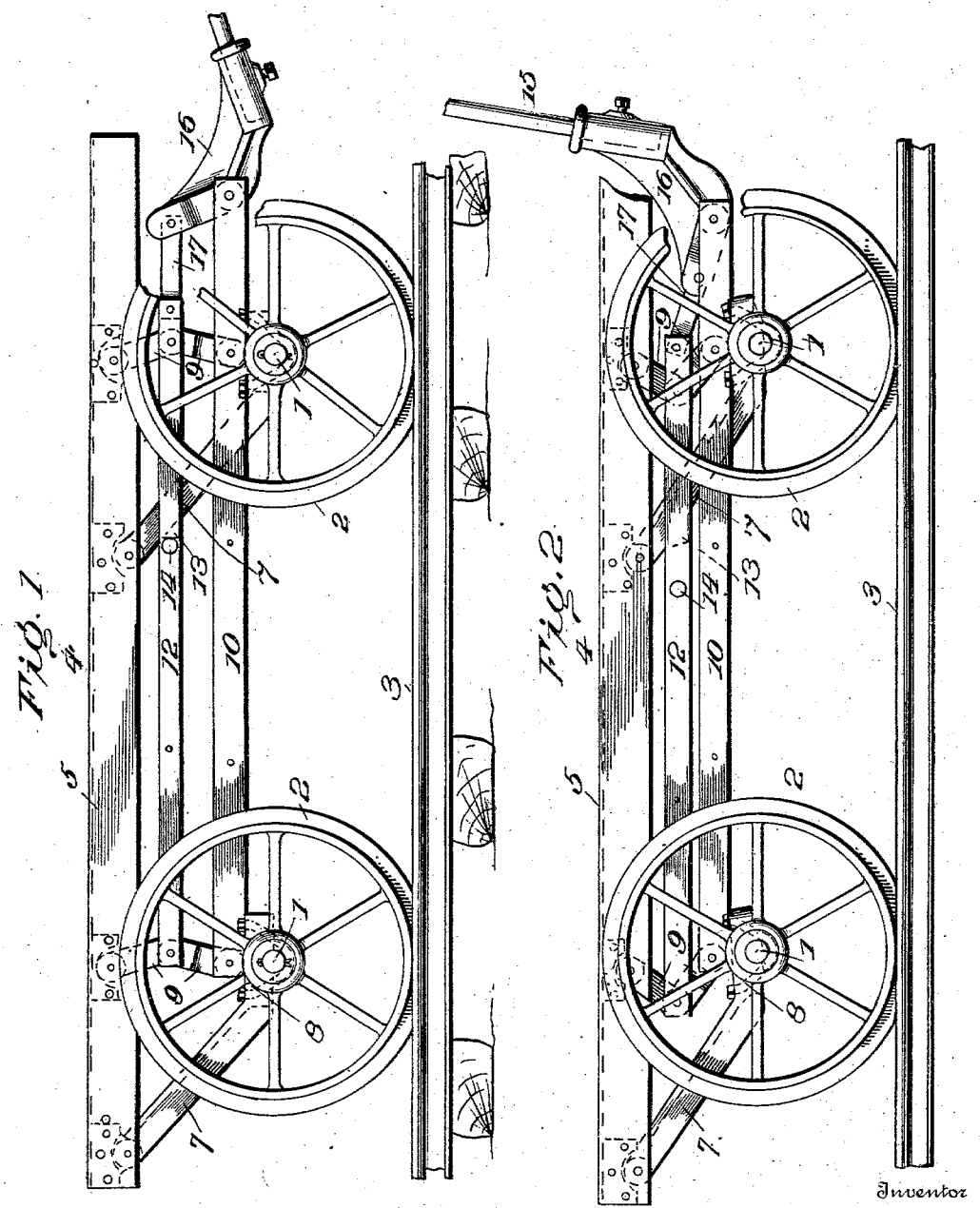

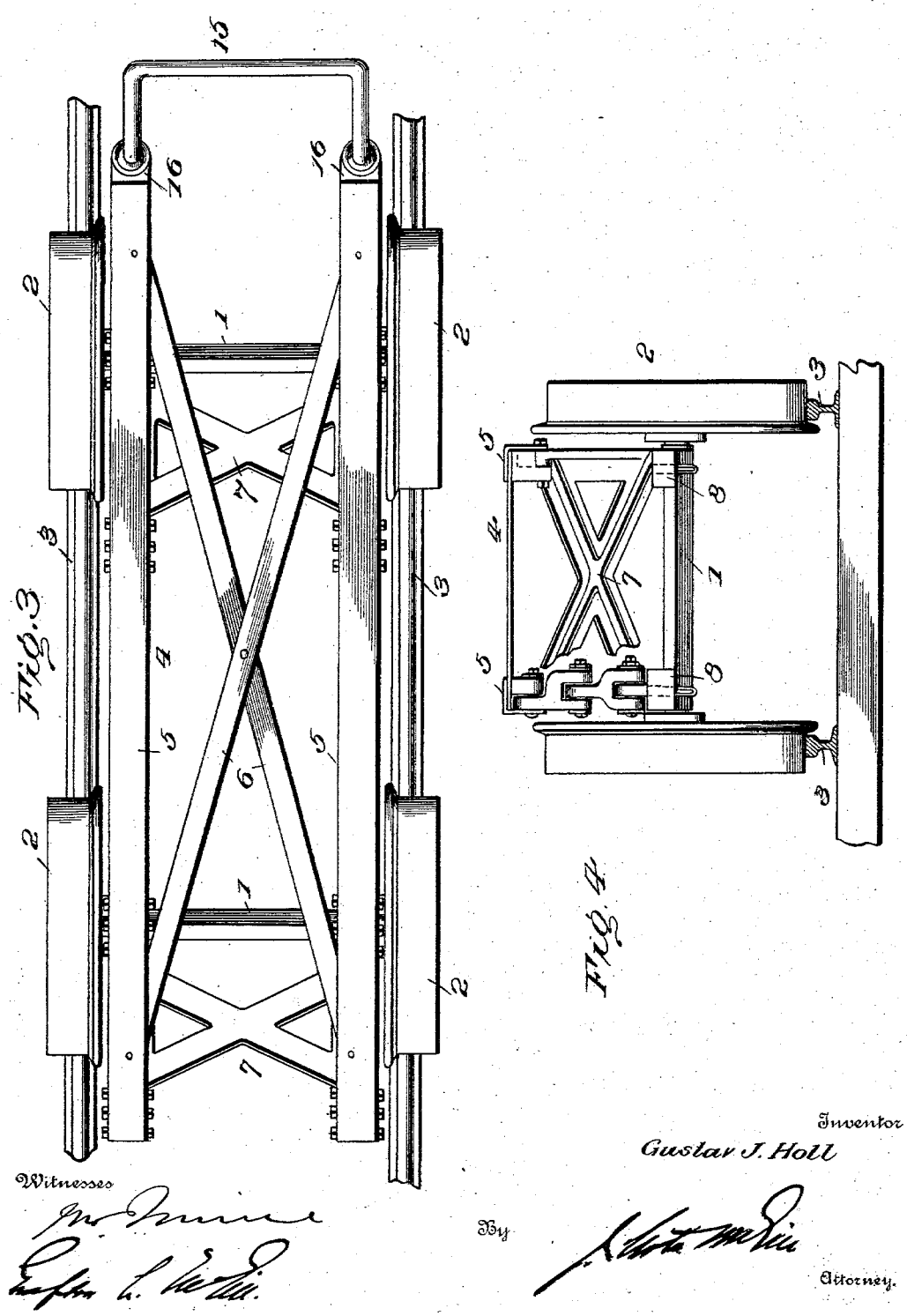

UNITED STATES PATENT OFFICE.

GUSTAV J. HOLL, OF CLEVELAND, OHIO.

ELEVATING-TRUCK.

SPECIFICATION forming part of Letters Patent No. 740,275, dated September 29, 1903.

Application filed February 4, 1903. Serial No. 141,911. (No model.)

*To all whom it may concern:*

Be it known that I, GUSTAV J. HOLL, of Cleveland, in the county of Cuyahoga and State of Ohio, have invented certain new and useful Improvements in Elevating-Trucks; and I do hereby declare the following to be a full, clear, and exact description of the invention, such as will enable others skilled in the art to which it appertains to make and use the same.

The object of this invention is to so construct an elevating-truck primarily designed for carrying pallets of molded bricks that the lifting or elevating of the platform does not require any greater power at the beginning of the operation than at its completion.

Further objects contemplate the provision of a truck having a minimum number of parts coupled with great rigidity and insuring an even distribution of the load on the platform.

The invention will be hereinafter fully set forth, and particularly pointed out in the claims.

In the accompanying drawings, Figure 1 is a view in side elevation with the platform raised. Fig. 2 is a similar view with the platform lowered. Fig. 3 is a plan view. Fig. 4 is a rear end view with parts broken away.

Referring to the drawings, 1 designates the truck-axles, and 2 carrying-wheels movable on rails 3.

4 designates the movable platform, composed, preferably, of parallel angle-bars 5, braced together by cross-bars 6. This platform is supported directly by the axles through supporting-frames 7, each frame being angularly disposed and pivotally connected at its upper end to bars 5, the lower ends of the frames being held to the axles by clevises 8, which permit the frames 7 to turn on the axles in the raising and lowering of the platform. The platform is connected to the lower portions of frames 7 by toggles 9. The toggles on each side of the truck are connected at their lower ends by brace-bars 10 and at their bends or knee-joints by a second set of bars 12, these bars 10 and 12 at their forward ends extending short distances beyond the front toggles. The forward supporting-frame 7 is formed with offsets or shoulders 13, with which are designed to engage stops 14, carried by the bars 12, such engagement occurring after the platform has been lifted and the toggles have passed slightly beyond their dead-centers, thus arresting any further forward movement of the platform.

15 is the U-shaped handle secured at its ends in sockets of levers 16, fulcrumed on the extended ends of bars 10. These levers are slightly angular and are connected at their rear ends by links 17 to the extended ends of bars 12. When the platform is lowered, the rear ends of levers 16 are in substantially straight lines with links 17, (see Fig. 2,) while when the toggles are approximately perpendicular, as shown in Fig. 1, the levers and links are nearly at right angles to each other. By reason of this construction the raising of the platform does not require any greater power at the beginning than at the ending of the movement. By bearing downwardly on the outer end of the handle the platform will be caused to rise under the action of the toggles, power being communicated thereto from levers 16 through links 17 and bars 12. When the platform is fully raised and the toggles are just an appreciable extent beyond a dead-center, further forward movement of the platform is arrested by the engagement of stop 14 with the forward supporting-frame 7.

The advantages of my invention are apparent. It will be seen that when the platform is raised the stability thereof is insured by the positions occupied by the toggles and also that by the means employed the raising and lowering of the platform may be readily and easily accomplished. Furthermore, I am enabled to secure an equal distribution of the load by reason of the connection between the platform and the truck-axles. The axles being secured directly to the lower ends of the supporting-frames 7, no lower frame is required, the bars 10 merely forming a brace to retain the axles and supporting-frames in proper relative positions.

I claim as my invention—

1. A truck having a movable platform, front and rear toggles supporting such platform, parallel brace-bars to which such toggles are connected at their lower ends, connections between the toggles, an angular lever fulcrumed on such brace-bars, and a link connecting such lever to the toggle connections, as set forth.

2. A truck having front and rear axles, a movable platform, means connecting the latter to said axles, toggles also connecting said platform to the axles, and means for actuating the toggles, as set forth.

3. A truck having front and rear axles, supporting-frames loosely secured to such axles, a movable platform secured to such frames, toggles connecting said platform and axles, levers, and means connecting such levers to both sets of toggles, as set forth.

4. A truck having front and rear axles, supporting-frames loosely secured to such axles, a movable platform secured to such frames, toggles connecting said platform and axles, bars connecting the toggles at their bends or knee-joints, levers, and links connecting such levers to said connecting-bars, substantially as set forth.

5. A truck having front and rear axles, supporting-frames loosely secured to such axles, a movable platform secured to such frames, toggles connecting said platform and axles, bars connecting the toggles at their bends or knee-joints, levers, links connecting such levers to said connecting-bars, and a stop carried by said connecting-bars for engaging one of said supporting-frames to arrest the forward movement of said platform, substantially as set forth.

6. A truck having front and rear axles, supporting-frames loosely secured to such axles, brace-bars 10 connecting such frames, a movable platform secured to such frames, toggles secured at their upper ends to the platform and at their lower ends to said frame, bars 12 connecting the forward and rearward toggles at their bends or knee-joints, angular levers fulcrumed on said bars 10, links connecting such levers to said bars 12, a handle secured at its ends to such levers, and a stop carried by said bars 12 for arresting the forward movement of the platform by engagement with one of the supporting-frames, as set forth.

7. The combination with the support, the carrying-wheels and axles, of the movable platform, means connecting such platform to said support comprising front and rear toggles, a connection between such toggles, an angular lever fulcrumed on said support, and a link connecting such lever to the toggle connection, said link and adjacent end of lever being in line when the platform is lowered, and angularly disposed when it is raised, substantially as set forth.

In testimony whereof I have signed this specification in the presence of two subscribing witnesses.

GUSTAV J. HOLL.

Witnesses:
EDWARD S. ALLEN,
PHILIP VOELKLE.